Oct. 2, 1945.   W. E. WING   2,386,027
METHOD OF SEPARATING MAGNESIA FROM DOLOMITE
Filed Jan. 21, 1944
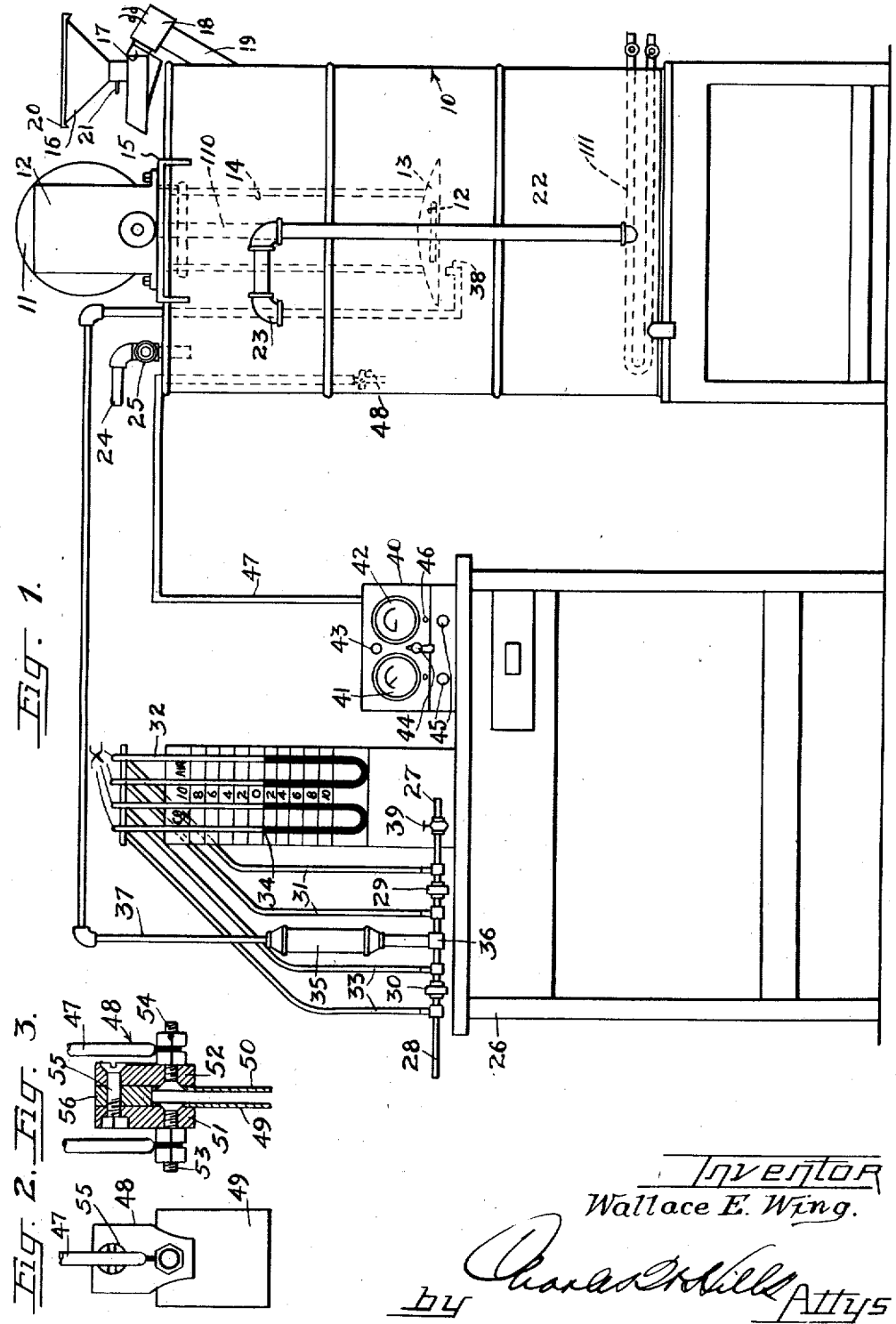
Inventor
Wallace E. Wing.

Patented Oct. 2, 1945

2,386,027

UNITED STATES PATENT OFFICE 2,386,027

METHOD OF SEPARATING MAGNESIA FROM DOLOMITE

Wallace E. Wing, Chicago, Ill., assignor to Marblehead Lime Company, Chicago, Ill., a corporation of Delaware Application January 21, 1944, Serial No. 519,108

5 Claims. (Cl. 23—201)

This invention relates to a method of separating magnesia from dolomite. More particularly, the invention relates to the separation of magnesia in the form of the hydrate, or magnesium hydroxide, from a calcined dolomite by means of a controlled carbonation of a water suspension of such calcined dolomite.

In the Stump Patent No. 2,231,965 there is disclosed a method of carbonating lime and separating the same from magnesia in which a wet slurry of the lime and magnesia is introduced into a carbonator and carbonation of the lime effected at a point before the isoelectric point of the suspension is reached or passed. According to that process, therefore, the burned lime containing magnesia is first slaked to hydrate the lime and form a slurry. The patent states that in this way satisfactory results are obtained, whereas if dry hydrated lime is used, the process will not ordinarily operate satisfactorily.

I have now found that better results can be obtained than through the use of the slurry of hydrated lime suggested in the Stump patent if calcined dolomite is added directly to the carbonator in a finely comminuted, dry and unslaked condition. In the case of the slurry, the slaking of the burned dolomitic lime to the hydrated form is critical in order to get the lime in the right condition so that the magnesia is in the proper colloidal state. Where a dry feed is used in accordance with the process of my present invention, the delicate operation of first forming a slurry of the hydrated lime is completely eliminated. Furthermore, the separation of the lime as calcium carbonate from the magnesia appears to be greatly facilitated, possibly because the carbonation of the lime proceeds in advance of the slaking of the magnesia. It is my theory that magnesium hydroxide inhibits the growth of the crystals of calcium carbonate and that by bringing about the growth of such calcium carbonate crystals before hydration of the magnesia occurs, a better separation can be effected.

I have also found that the temperature used in calcining the dolomite is critical and that the calcining should be carried out at temperatures between 2000 and 2200° F. for best results. The dolomite should be thoroughly calcined to convert it into the oxides of calcium and magnesium, but should not be overburned.

I have also found that the concentration of the solids in the water suspension of the lime and magnesia at the time of carbonation should be relatively high and at least above a minimum of 12% of solids by weight. The maintenance of such a relatively high concentration of solids in the suspension undergoing carbonation also facilitates the separation of the magnesia from the calcium carbonate.

In addition, I have found that the isoelectric point varies with the temperature of the suspension undergoing carbonation. By the term "isoelectric point" is meant that point at which all of the lime is present in the form of calcium carbonate and therefore the suspension has the highest degree of electrical resistance or the lowest degree of conductivity. Consequently, the rate and extent of carbonation should be regulated carefully to a point slightly in advance of the isoelectric point for the temperature at which carbonation is being effected. I have found that the preferable temperature range within which to carry out the carbonation lies between 55 and 65° C. When operating within this temperature range, the suspension should be maintained at a point slightly in advance of the isoelectric point for the particular temperature obtaining.

It is therefore an important object of this invention to provide an improved process for the separation of magnesia from dolomite, in accordance with which properly burned dolomite in finely comminuted, dry and unslaked condition is fed directly into a body of water in a carbonating vessel and the rate and extent of carbonation are carefully regulated so as to maintain the resulting suspension at a point slightly in advance of the isoelectric point of the suspension at the temperature obtaining therein, whereby the separation of crystalline calcium carbonate from the resulting colloidal magnesia, or magnesium hydrate, is greatly facilitated.

It is a further important object of this invention to provide a process for the separation of magnesia from dolomite in accordance with which a mixture of carbon dioxide and air is introduced into a water suspension of calcium and magnesium oxides at a rate so controlled as to maintain said suspension in advance of its isoelectric point while the temperature of said suspension is held between the limits of about 55 and 65° C., whereby a separation of crystalline calcium carbonate from colloidal magnesia, or magnesium hydroxide, can be more readily effected.

Other and further important objects of this invention will be apparent from the disclosures in the specification and the accompanying drawing.

On the drawing:

Figure 1 is a somewhat diagrammatic elevational view illustrating a type of apparatus adapted for carrying out the method of my invention;

Figure 2 is an enlarged fragmentary detail view of the electrode for measuring conductivity in the suspension in the carbonator vessel; and Figure 3 is a longitudinal sectional view of the electrode of Figure 2, with parts in elevation.

The starting material for use in my method is preferably a true dolomite. In order to effect a satisfactory separation of the magnesia from the lime in accordance with my invention, the dolomite should be carefully calcined within a temperature range of between 2000 and 2200° F., caution being taken to prevent overburning. Where the dolomite has been calcined at temperatures either below 2000° F. or above 2200° F., good separation could not be obtained in accordance with my process.

The size of the stone used in calcining was found to have some effect on the separation. This was probably due to the fact that if dolomite lumps larger than about three-quarters of an inch were used, the dolomite would not be calcined completely throughout the lumps, for the reason that the center portions of the stone would not have reached temperatures high enough to expel all of the carbon dioxide. The result was that this imperfectly calcined material would not readily slake in the carbonator and effective separation could not be obtained.

On the other hand, a dolomite which comprised aggregates smaller than one-eighth inch was found to have a great amount of dead-burned dolomite. This, again, proved unsatisfactory, since no slaking would be obtained and no separation would take place in the carbonator. The most satisfactory size was found to be one between a maximum of three-quarters inch and a minimum of one-eighth inch.

The calcined dolomite is next pulverized by any suitable mill to get a powdered material that will, in general, pass through a 100 mesh screen. This fineness of the comminuted oxides, however, is not absolutely necessary, since my method is operative when coarser particle sizes are employed. The reason that the 100 mesh or finer material is recommended is that in carbonating the possibility of the material not slaking while being brought into suspension is lessened and more certainly assures a successful operation.

After pulverizing, the calcined dolomite is placed in an air-tight container to prevent the absorption of carbon dioxide and moisture from the air. Any suitable precaution should be taken to assure a calcined dolomite that is not partially air-slaked.

A type of apparatus that has been found suitable for use in the carrying out of the method of my invention will now be described. It will be understood, however, that other forms of apparatus embodying the general principles of the one illustrated in the drawing can be employed.

As illustrated in Figure 1, the reference numeral 10 indicates a carbonating vessel, which is provided with a suitable form of agitating mechanism, such as a turbomixer, comprising a motor 11, speed reducing mechanism 12 and a dependent shaft 110 having at its lower end an agitating paddle 12. Said agitator shaft 110 extends through a disk-like hood ring 13 which is stationarily supported by rods 14 from the motor support 15. A suitable feed mechanism is employed for feeding the calcined dolomite at a controlled rate into the carbonator 10. As illustrated, this feed mechanism comprises a hopper 16, opening at the bottom onto a closely spaced plate 17 adapted to be vibrated by means of a solenoid operated mechanism 18 mounted from said carbonator by a bracket 19. Said hopper 16 may be closed by a cover 20 to prevent the access of air to the interior and may have a slidable gate valve 21 for closing the bottom of the hopper when not in use.

The carbonator vessel 10 is provided with an overflow pipe 22, which is connected near the bottom of the vessel and extends upwardly to the level that is to be maintained within the carbonator vessel. The upper end of said pipe 22 is provided with an offset discharge end 23 at that level. A water intake 24, provided with a valve 25 serves for the introduction of water into the carbonator vessel.

Apparatus for controlling the introduction of carbon dioxide gas into the carbonator is mounted nearby on a supporting table 26 or the like. Said apparatus comprises a valve controlled air intake pipe 27 and a carbon dioxide intake pipe 28. An orificed disk is set in a union 29 positioned in the air intake pipe 27 and a similar orificed disk in the union 30 positioned in the carbon dioxide air intake pipe. On either side of the union 29 is a flexible tube 31 leading to the upper end of a manometer tube 32 for measuring the air pressure. Similarly, on either side of the union 30 is connected a flexible tube 33 leading to the upper ends of a manometer tube 34 for measuring the carbon dioxide pressure. A mixing cylinder 35 is connected a flexible tube 33 leading to the upper carbon dioxide intake 28, as at 36 and discharges at its upper end into a pipe 37 that extends over to the carbonating vessel and terminates beneath the disk-like hood ring 13 in an up-turned open end 38.

In the carbonating operation the pair of manometer tubes 32 and 34 serve to measure the flow of carbon dioxide and air to the mixing cylinder 35 and hence to the carbonator 10. The carbon dioxide gas is introduced into the intake pipe 28 from a cylinder (not shown) provided with a needle valve. That valve and the valve 39 in the air intake, together with the orificed disks in the unions 29 and 30 enable the flow of gas and air to be controlled to effect the desired proportion of the two. The readings on the manometers 32 and 34 indicate, respectively, the differential air and gas pressure on the intake and discharge sides of the orificed disks 29 and 30, and thus enable the operator to regulate the flow of air and gas to effect the desired mixture. In general, a mixture of gas and air in the ratio of one part of carbon dioxide to three parts of air by volume has been found most satisfactory, but it would, of course, be possible to use waste gases from a calcining kiln, or other source of carbon dioxide, where the proportions of carbon dioxide to air are, in general, within the limits of from one part of $CO_2$ to four parts of air, and of from one part of $CO_2$ to two parts of air, by volume.

The control apparatus also includes a milliammeter 40, which has a pair of dials provided with scale readings from 0 to 100 milliamperes, for instance, the dial 41, and from 0 to 250 milliamperes, the dial 42. The milliammeter 40 is also provided with a pilot light 43 to show when current is flowing, an adjustment 44 for co-setting the amperage, and fuses 45 to prevent overloading. Switches 46 are provided for switching on one or the other of the circuits including the dials 41 or 42.

Wires 47 lead from the milliammeter to an electrode 48 immersed within the suspension in the carbonator vessel 10 and freely movable therein. Said electrode 48 is illustrated in detail in Figures 2 and 3, in which the electrode is shown as comprised of a pair of spaced plates 49 and 50, the upper ends of which are secured to insulation members 51 and 52 by means of screws 53 and 54. Said insulation blocks 51 and 52 are in turn secured together by a bolt 55 passing through the upper ends of said block and through a spacer block 56. The electrode plates 49 and 50 are preferably a pair of stainless steel plates, spaced about one-eighth inch apart, and each of the same surface area. The electrode 48 is suspended freely in the suspension in the carbonator vessel 10 and connected by means of the insulated leads 47 to the milliammeter. The stainless steel plates 49 and 50 may, for instance, be seven-eighths inch by one inch on a side.

In order to standardize the milliammeter used to record the range in which the carbonating of the calcium hydroxide in the dolomite takes place, the electrode 48 is placed in a saturated lime water solution and the milliammeter set to give a reading of 200 milliamperes. Alternatively, the electrode may be standardized by placing it in a solution of slaked dolomite maintained at a temperature of 60° C. A current of carbon dioxide gas is then passed through the dolomite solution and the lowest point of conductivity is recorded and used as a minimum point of carbonating. It is advisable to add about 10 milliamperes to this reading when carbonating in the carbonator vessel 10. For example, if the minimum milliamperes reading were 110 at 60° in the standardizing of the electrode in a solution of slaked dolomite, the carbonating in the vessel 10 should be carried out while maintaining the conductivity of the suspension at a milliampere reading of 120 for the temperature range of between 55 and 65° C.

The higher the temperature the higher the milliamperes passing between the electrodes. This is illustrated in the table below, showing the isoelectric point of the dolomite solution at various temperatures.

| Temperature, °C. | Iso-electric point, ma. |
|---|---|
| 20 | 63 |
| 30 | 72 |
| 40 | 84 |
| 50 | 96 |
| 60 | 105 |
| 70 | 113 |
| 80 | 119 |
| 90 | 126 |

The lowest reading on the milliammeter during carbonation is called the isoelectric point and it is at this point that all of the lime in solution has been converted into calcium carbonate. The magnesia begins to coagulate and settle out with the calcium at the isoelectric point, and if the carbonation is carried beyond the isoelectric point, the calcium carbonate starts to be converted into calcium bicarbonate and to go into solution, causing an increase in the reading on the milliammeter. It is thus necessary to operate at a fairly high milliampere reading in advance of the minimum reading, or isoelectric point, to exclude any possibility of settling out the magnesia fraction with the calcium carbonate and also to exclude any possibility of over-carbonating so as to put the calcium carbonate back into solution as calcium bicarbonate.

In starting a carbonating operation, the vessel 10 is filled with water at 35° C. and the turbo-mixer or agitator set in operation. The electrode 47, which has already been standardized as above described, is then placed in the water in the carbonator vessel 10. The milliampere reading is then recorded and if under 100 milliamperes, enough of the previously prepared powdered, unslaked, calcined dolomite is fed into the carbonator to increase the milliampere reading to this point.

The separation of the calcium and magnesia fractions is now ready to be initiated. The carbon dioxide is introduced through the intake pipe 28 until the proper reading on the manometer tube 34 is reached, as for instance a reading of 10 inches. Similarly, air is introduced through the air intake pipe 27 until the reading on the manometer tube 32 is, for instance, 10 inches. The mixture of gases as obtained in the mixer 35 is then introduced into the turbo-mixer through the upturned open end 38 of the pipe line 37. Carbonation thus begins and separation of the calcium carbonate commences almost immediately.

From this point on, the process continues practically automatically by adjusting the rate of feed of the calcined dolomite from the hopper 16. Within the preferred operating temperatures of 55° to 65° C., the rate of feed of the dry, calcined dolomite is adjusted so as to maintain the conductivity of the suspension in the carbonator vessel 10 between a reading of 110 and a reading of 125 milliamperes on the milliammeter 40. At other temperatures, higher or lower milliammeter readings should be maintained in accordance with the foregoing table. As the carbonating of the calcium oxide takes place, the milliampere reading will drop, but by proper adjustment of the rate of feed of the calcined dolomite in accordance with the rate of introduction of the mixture of carbon dioxide gas and air into the turbo-mixer, the conductivity of the suspension may be kept within the foregoing range of between 110 and 125 milliamperes. It has been found that this range is preferable when carrying out the reaction at a temperature within the range of between 55 and 65° C. Since the slaking of the calcined dolomite generates heat, it may be necessary to provide means, such as the coil 111, for cooling the suspension in the carbonator vessel 10 in order to maintain the indicated temperature range.

The operation is continued until the concentration of the suspension in the carbonator vessel reaches a minimum of at least 12% solids by weight of the suspension. Preferably the concentration of solids is equivalent to that of about 1 pound of dolomite per gallon, or 15% total solids by weight of the suspension. The concentration may be carried as high as 2 pounds equivalent dolomite per gallon or about 30% of total solids by weight of the suspension.

When the concentration reaches the desired figure, a stream of water is introduced through the intake pipe 24, as controlled by the valve 25, at such a rate as to maintain the solids concentration more or less constant. The carbonated suspension is run off through the overflow pipe 22, discharging from the open end 23 of said overflow into a suitable vessel or container. The rate of water addition is such that a definite overflow takes place and the concentration of solids in the carbonator vessel remains practically constant. The automatic feeding device comprising the hopper 16 and vibrating plate 17 is operated at such speed as to feed the dry, powdered calcinated dolomite into the carbonator so as to keep the conductivity of the suspension between the readings of 110 and 120 milliamperes. When the conductivity rises, the feed device is operated at a reduced speed to keep the conductivity within this range; or if the conductivity rises above 120 milliamperes, the feed can be shut off by hand or by any suitable automatic means.

In order to flocculate the magnesia for recovery from the suspension of crystalline calcium carbonate and colloidal magnesia or magnesium hydroxide, it is desirable to carry out a second carbonation, also at a temperature of between 55 and 65° C. The standardized electrode is positioned in the suspension and carbonation with a small stream of carbon dioxide and air is carried on until the isoelectric point is reached. Carbonation is continued for several seconds after the isoelectric point is reached until the conductivity has again risen a few milliamperes. By letting the suspension stand or by running it through a centrifuge machine, the water can be drawn off almost completely and the magnesia then dried to give a powder.

As indicative of the extent to which the separation between lime and magnesia can be effected, the calcium hydroxide content in the final separated magnesia, or magnesium hydroxide, can be kept as low as around 0.1% by weight. After the first carbonation and prior to the second carbonation, the suspended colloidal magnesia may analyze as follows:

| | |
|---|---|
| MgO | 65.5 |
| CaO | 0.6 |
| Loss on ignition | 31.5 |

At this same stage of the process, namely after the first carbonation and prior to the second carbonation, the calcium carbonate sludge may analyze as follows:

| | |
|---|---|
| CaO | 48.9 |
| MgO | 9.3 |
| Loss on ignition | 39.4 |

This calcium carbonate sludge can be further purified by carbonation to convert the magnesia into magnesium bicarbonate, which goes into solution. The practically pure calcium carbonate crystals can then be separated by filtration from the resulting magnesium bicarbonate solution.

The second carbonation is for the purpose of flocculating the magnesia or magnesium hydroxide. If it is not desired to obtain the magnesia, or magnesium hydroxide, in dry form, this second carbonation may, of course, be omitted.

From the foregoing description, it will be apparent that my method provides an efficient way of recovering magnesia, or magnesium hydroxide, in relatively pure condition, free from all but traces of calcium hydroxide. It also provides for the recovery of calcium carbonate in a regular, crystalline form that separates readily from the colloidal suspension of the magnesia, or that can be separated readily by passing the entire mass through a centrifuge. The colloidal magnesia, or magnesium hydroxide, will, of course, pass out of the centrifuge in suspension and the magnesia, or magnesium hydroxide, may be recovered from the suspension by the second carbonating step, as above described. The process may be operated either as a batch process or as a continuous process.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of separating magnesia from a calcium-magnesium carbonate containing mineral that has been burned substantially completely to a mixture of calcium and magnesium oxides, which comprises pulverizing said oxides, feeding said pulverized oxides in dry condition directly into an agitated and carbonated body of water to form a suspension of said oxides therein, regulating the introduction of diluted carbon dioxide into said water suspension at such a rate as to maintain the conductivity of said suspension above that at the isoelectric point at the temperature obtaining, maintaining the temperature of said body of water during carbonation at between 20 and 90° C., and separating magnesia and magnesium hydroxide from the resulting calcium carbonate.

2. The method of separating magnesia from dolomite that has been calcined at a temperature of between 2000 and 2200° F. until substantially completely converted into the oxides of calcium and magnesium, which comprises feeding said oxides in finely comminuted, dry form directly into an agitated and partially carbonated body of water to form a suspension having a minimum solids concentration of 12% by weight, regulating the introduction of diluted carbon dioxide into said suspension at such a rate as to maintain the conductivity there of slightly above that at the isoelectric point at the temperature obtaining, maintaining said temperature between 20 and 90° C. and separating magnesia and magnesium hydroxide from the resulting calcium carbonate.

3. The method of separating magnesia from dolomite, which comprises calcining dolomite at a temperature between 2000° and 2200° F. until substantially completely converted into the oxides of calcium and magnesium, comminuting said oxides, introducing said comminuted oxides in dry unslaked form into a body of water to form a water suspension of said oxides, passing into said suspension simultaneously with the slaking of said oxides a mixture of about 3 parts of air and 1 part of carbon dioxide by volume in sufficient amount and at a sufficient rate to maintain the conductivity of said suspension at a point above that at the isoelectric point at the temperature thereof, maintaining said temperature between 55° and 65° C. drawing off the resulting suspension of calcium carbonate and magnesium hydroxide and separating said magnesium hydroxide from said calcium carbonate.

4. The method of separating magnesia from dolomite, which comprises calcining dolomite at a temperature between 2000° and 2200° F. until substantially completely converted into the oxides of calcium and magnesium, comminuting said oxides, introducing said comminuted oxides in dry unslaked form into a body of water to form a water suspension of said oxides, passing into said suspension simultaneously with the slaking of said oxides a mixture of about 3 parts of air and 1 part of carbon dioxide by volume in sufficient amount and at a sufficient rate to maintain the conductivity of said suspension at a point above that at the isoelectric point at the temperature thereof, maintaining said temperature between 55° and 65° C. drawing off the resulting suspension of calcium carbonate and magnesium hydroxide and separating said magnesium hydroxide from said calcium carbonate, continuing the introduction of said comminuted oxides into said suspension until the concentration of solids is equivalent to at least one pound of dolomite per gallon.

5. The method of separating magnesia from dolomite, which comprises calcining dolomite at a temperature between 2000° and 2200° F. until substantially completely converted into the oxides of calcium and magnesium, comminuting said oxides, introducing said comminuted oxides in dry unslaked form into a body of water to form a water suspension of said oxides, passing into said suspension simultaneously with the slaking of said oxides a mixture of about 3 parts of air and 1 part of carbon dioxide by volume in sufficient amount and at a sufficient rate to maintain the conductivity of said suspension at a point above that at the isoelectric point at the temperature thereof, maintaining said temperature between 55° and 65° C. and separating said magnesium hydroxide from said calcium carbonate.

WALLACE E. WING.

DISCLAIMER 2,386,027.—*Wallace E. Wing*, Chicago, Ill.. METHOD OF SEPARATING MAGNESIA FROM DOLOMITE. Patent dated Oct. 2, 1945. Disclaimer filed Aug. 2, 1947, by the assignee. *Marblehead Lime Company*.

Hereby enters this disclaimer to claim 1 in said specification.

[*Official Gazette August 26, 1947.*]

into said suspension simultaneously with the slaking of said oxides a mixture of about 3 parts of air and 1 part of carbon dioxide by volume in sufficient amount and at a sufficient rate to maintain the conductivity of said suspension at a point above that at the isoelectric point at the temperature thereof, maintaining said temperature between 55° and 65° C. drawing off the resulting suspension of calcium carbonate and magnesium hydroxide and separating said magnesium hydroxide from said calcium carbonate, continuing the introduction of said comminuted oxides into said suspension until the concentration of solids is equivalent to at least one pound of dolomite per gallon.

5. The method of separating magnesia from dolomite, which comprises calcining dolomite at a temperature between 2000° and 2200° F. until substantially completely converted into the oxides of calcium and magnesium, comminuting said oxides, introducing said comminuted oxides in dry unslaked form into a body of water to form a water suspension of said oxides, passing into said suspension simultaneously with the slaking of said oxides a mixture of about 3 parts of air and 1 part of carbon dioxide by volume in sufficient amount and at a sufficient rate to maintain the conductivity of said suspension at a point above that at the isoelectric point at the temperature thereof, maintaining said temperature between 55° and 65° C. and separating said magnesium hydroxide from said calcium carbonate.

WALLACE E. WING.

DISCLAIMER 2,386,027.—*Wallace E. Wing*, Chicago, Ill.. METHOD OF SEPARATING MAGNESIA FROM DOLOMITE. Patent dated Oct. 2, 1945. Disclaimer filed Aug. 2, 1947, by the assignee. *Marblehead Lime Company*.

Hereby enters this disclaimer to claim 1 in said specification.

[*Official Gazette August 26, 1947.*]